(12) United States Patent
Takada et al.

(10) Patent No.: US 9,158,056 B2
(45) Date of Patent: Oct. 13, 2015

(54) LIGHT SPREADING ILLUMINATION APPARATUS HAVING A LIGHT GUIDE WITH INCLINED PORTION HAVING AT LEAST ONE PEDESTAL AND A LIGHT BLOCKING MEMBER DISPOSED THEREON

(71) Applicant: MINEBEA CO., LTD., Kitasaku-gun, Nagano (JP)

(72) Inventors: Shohei Takada, Hamamatsu (JP); Tomotaka Horikawa, Fukuroi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 168 days.

(21) Appl. No.: 13/945,488

(22) Filed: Jul. 18, 2013

(65) Prior Publication Data

US 2014/0036541 A1 Feb. 6, 2014

(30) Foreign Application Priority Data

Aug. 3, 2012 (JP) ................................. 2012-173003

(51) Int. Cl.
*F21V 8/00* (2006.01)

(52) U.S. Cl.
CPC .............. *G02B 6/0068* (2013.01); *G02B 6/002* (2013.01); *G02B 6/0021* (2013.01); *G02B 6/0031* (2013.01); *G02B 6/0083* (2013.01)

(58) Field of Classification Search
CPC .. G02B 6/0011; G02B 6/0013; G02B 6/0083; G02B 6/0021; G02B 6/0046; G02B 6/0068; G02B 6/002
USPC .......................................... 362/621, 628, 631
See application file for complete search history.

(56) References Cited

U.S. PATENT DOCUMENTS

| | | | | |
|---|---|---|---|---|
| 8,118,465 B2 * | 2/2012 | Kunimochi et al. | ........... | 362/612 |
| 8,310,620 B2 * | 11/2012 | Yabe | ................................ | 349/61 |
| 2011/0141397 A1 * | 6/2011 | Lee | .................................. | 349/64 |

FOREIGN PATENT DOCUMENTS

JP   A-2011-096523   5/2011

* cited by examiner

*Primary Examiner* — Robert May
(74) *Attorney, Agent, or Firm* — Oliff PLC

(57) ABSTRACT

A spread illuminating apparatus includes a plurality of point light sources; a printed circuit board on which the plurality of point light sources is each mounted; and a light guide plate with a light input surface facing the point light source and a light output portion that exits plane light emitted from the point light source and introduced through the light input surface, wherein the light guide plate includes an inclination portion between the light input surface and the light output portion, the inclination portion having a thickness gradually decreasing toward the light output portion side, an inclined surface of the inclination portion includes a pedestal for disposing the printed circuit board in an area except the front of the point light source, and a light-blocking member is disposed between the neighboring pedestals.

20 Claims, 5 Drawing Sheets

LIGHT SPREADING ILLUMINATION APPARATUS HAVING A LIGHT GUIDE WITH INCLINED PORTION HAVING AT LEAST ONE PEDESTAL AND A LIGHT BLOCKING MEMBER DISPOSED THEREON

BACKGROUND OF THE INVENTION

1. Field of the Invention

The present invention relates to a side-light type spread illuminating apparatus having a light guide plate provided with a light output portion and a light input end face. A tight source is disposed on the light input end face so as to emit planar illumination light from the light output portion.

2. Description of the Related Art

For illumination units of a liquid crystal display panel, side-light type spread illuminating apparatuses (backlight) have been popularly used. In the apparatuses, light-emitting diodes (LEDs), being small but securing excellent environmental feasibilities, are arranged along the side end face of a light guide plate. These apparatuses have been widely employed in the field of miniaturized portable information apparatuses such as a mobile phone, etc.

In recent, for coping with need that makes the miniaturized portable information apparatuses to be further thinned, a light guide plate is configured to have an inclination portion between the light input surface and the light output portion. With formation of the inclination, the thickness of the light guide plate gradually decreases as moving away from the side end face (hereinafter, referred to as a light input surface) on which LEDs are arranged. For applying such a light guide plate, it is possible to thin the light output portion of the light guide plate regardless of the thickness of the LEDs.

In this type of the spread illuminating apparatus, the LEDs are typically arranged to face the light input surface of the light guide plate while being mounted on a rectangle circuit board. In this case, a front portion of the circuit board is abutted and fixed to the vicinity of the light input surface of the light guide plate (including an inclined surface of the inclination portion) so that the LED is positioned at the light guide plate.

In related arts, in such a type of the spread illuminating apparatus, when light is emitted from the LEDs and introduced into the light guide plate, some light is absorbed in the circuit board fixed to the inclined surface when reflected on the inclined surface. Further, as explained, since the circuit board is fixed to the inclined surface of the light guide plate, it becomes difficult for the light-emitting surface of the LED to face the light input surface of the light guide plate in parallel. A part of light that has been emitted from the light-emitting surface of the LED thus may externally leak without being introduced into the light input surface of the light guide plate. As a result, luminance of the illumination light may be degraded.

In order to solve the aforementioned problems and improve luminance of the illumination light, the applicant has proposed a spread illuminating apparatus described hereinbelow (see JP 2011-96523 A). FIG. 6 is an exploded plan view illustrating one example of the main parts of a spread illuminating apparatus 100. FIG. 7 is a cross-sectional view taken along a line A-A when the spread illuminating apparatus 100 is assembled. FIG. 8 is a plan view illustrating an exemplary flexible printed circuit board (hereinafter, referred to as a FPC) 131 in the spread illuminating apparatus 100 when viewed from the mount surface 131a side on which an LED 111, etc. are mounted.

In the spread illuminating apparatus 100, the light guide plate 121 includes: a light input portion 126 formed facing the light input surface 122; an inclination portion 127 formed continuously with the light input portion 126, the inclination portion 127 being configured that its thickness gradually decreases toward a front direction (meaning moving away from the light input surface 122); and a light output portion 128 formed in front of the inclination portion 127 and emits light, guided from the LED 111 toward the inclination portion 127, from the light output surface 125. In addition, the inclination portion 127 formed near the light input surface 122 of the light guide plate 121 includes a plurality of pedestals 129 in some areas except the front of the LED 111. The top surface 129a of each pedestal 129 is approximately perpendicular to the light input surface 122 of the light guide plate 121. The FPC 131 is fixed to the light guide plate 121 by bonding a part of the mount surface 131a to the top surface 129a of the pedestal 129 using a double-sided tape 140.

Furthermore, in the spread illuminating apparatus 100, the light guide plate 121 has a plurality of claw portions 130 that are separated from each other and protrude from the light input surface 122 to a rear direction (meaning opposite to the front direction). The top surface 130a of the claw portion 130 is approximately flush with the top surface 126a of the light input portion 126 and the top surface 129a of the pedestal 129. A part of the mount surface 131a of the FPC 131 is also bonded to the top surface 130a of the claw portion 130 using the double-sided tape 140.

In this configuration of the spread illuminating apparatus 100, while the FPC 131 is fixed to the light guide plate 121, the light-emitting surface 112 of the LED 111 faces the light input surface 122 of the light guide plate 121 approximately in parallel to each other. Therefore, it is possible to efficiently introduce light emitted from the light-emitting surface 112 of the LED 111 to the inside of the light guide plate 121 with no leakage light. In this manner, the spread illuminating apparatus 100 could achieve high luminance of the illumination light while solving the aforementioned problems.

Furthermore, in the spread illuminating apparatus 100, since the FPC 131 is fixed to the light guide plate 121, a gap would be present between the inclined surface 127a in front of the LED 111 and the mount surface 131a of the FPC 131. Therefore, light introduced into the light guide plate 121 and reflected on the inclined surface 127a can be suppressed from being absorbed into the FPC 131, being possible to achieve high luminance of the illumination light.

SUMMARY OF THE INVENTION

It is true that, as described above, the spread illuminating apparatus 100 illustrated in FIGS. 6 and 7 could have effects of high luminance of the illumination light. However, when considering luminance uniformity of illumination, there is still room for further improvement. Details are as follows. In the spread illuminating apparatus 100, a gap is formed between the inclined surface 127a in front of the LED 111 and the surface 131a of the FPC 131 facing the inclined surface 127a. Therefore, when leakage light is generated from the inclined surface 127a, at least a part of the leakage light propagates through the gap and leaks to the light output surface 125 side as schematically illustrated as an optical path C in FIG. 7. As a result, luminance uniformity of the illumination light may be degraded.

In addition, in the spread illuminating apparatus 100, the double-sided tape 140 (refer to FIG. 8) for bonding the mount surface 131a of the FPC 131 to the pedestal 129 and the claw portion 130 is typically formed to have a trunk portion 140b that is positioned in the rear side of the LED 111 and extends in a longitudinal direction of the FPC 131, and a plurality of branch portions 140a extending from the trunk portion 140b to the front direction. The front end of each branch portion 140a is bonded to the corresponding pedestal 120 and the corresponding claw portion 130. Here, the double-sided tape 140 does not have a portion for connecting front ends of the neighboring branch portions 140a (hereinafter, simply referred to a connecting portion) and is not disposed in front of the LED 111. The reason is as follows.

Specifically, when the FPC 131 is fixed to the light guide plate 121 in case that a connecting portion is provided in the double-sided tape 140, the connecting portion may have a portion that makes contact with the inclined surface 127a of the inclination portion 127 and is directly fixed onto the inclined surface 127a due to bending of the double-sided tape 140 or the like. In addition, the connecting portion is adapted to be located in front of the LED 111. Therefore, if such a contact is made, optical properties such as a refractive index may become different between a portion making contact with the connecting portion of the double-sided tape 140 and a portion that does not make contact with the connecting portion out of the portions in front of the LED 111 of the inclined surface 127a. This difference changes a distribution of light guided to the inclination portion 127 and, further, a luminance distribution (visual effect) of the illumination light emitted from the light output surface 125. Since it is difficult to suppress such a bending of the double-sided tape 140 that causes the contact, the luminance distribution of the illumination light for each product would be not the same.

Therefore, in order to prevent such a problem caused by a contact between the inclined surface 127a of the double-sided tape 140, it is desirable not to dispose the double-sided tape 140 in front of the LED 111 as illustrated in FIG. 8. In this case, the double-sided tape 140 is not allowed to have a portion that connects each front of the branch portions 140a adjacent to each other.

However, such a configuration of the double-sided tape 140 has the following problems in view of workability for fixing between the FPC 131 and the light guide plate 121.

Typically, the double-sided tape 140 has a protection member (hereinafter, referred to as a release liner) that protects a bonding layer in both front and rear surfaces during a non-application state. It is necessary to peel off such a release liner in order to attach the double-sided tape onto both the FPC 131 and the light guide plate 121. Hence, in the configuration of the double-sided tape 140 illustrated in FIG. 8, a front portion of the branch portion 140a may be easily peeled off together with the release liner when the release liner is peeled off. In a case that such peeling-off occurs, it is necessary to recover the portion erroneously peeled off. This may cause the attaching work cumbersome.

Such a peeling-off problem becomes significant when a space for the trunk portion 140b in the rear side of the LED 111 of the FPC 131 cannot be obtained, and when it is necessary to form each branch portion 150a in a perfectly isolated state (island shape) as in the double-sided tape 150 of FIG. 9. Here, FIG. 9 is a plan view illustrating the double-sided tape 150 while the release liner is attached. In FIG. 9, each branch portion 150a (hatched) includes a main body of the double-sided tape 150 and a release liner that covers the main body of the double-sided tape 150. The non-hatched L-shaped portions 151 and 152 include only the release liner. Typically, a portion 151 extending to the outside from the outermost branch portion 150a (right side in FIG. 9) out of the L-shaped portions 151 and 152 is used as a tab when the release liner is peeled off. The portion 152 of each branch portion 150a extending to the rear direction serves as a temporary trunk portion that connects each branch portion 150a before the release liner is peeled off.

In a case where the branch portion 150a is formed in an island shape in this manner, one or more branch portions 150a may be completely peeled off together with the release liner when the release liner is peeled off. Therefore, workability for fixing the FPC 131 and the light guide plate 121 is further degraded.

In view of the problems described above, the present invention provides a spread illuminating apparatus having excellent luminance uniformity and excellent workability when a circuit board is fixed to the light guide plate.

Hereinafter, various aspects of the invention will be exemplarily described on an aspect basis for convenient description purposes. Each aspect is not intended to limit the technical scope of the invention. It would be appreciated, by carefully reading the best modes of the present invention, that a part of elements in each claim may be substituted or deleted, or another element may be added without departing from the spirit and scope of the present invention.

According to a first aspect of the invention, there is provided a spread illuminating apparatus including: a plurality of point light sources; a printed circuit board on which the plurality of point light sources is each mounted; and a light guide plate with a light input surface facing the point light source and a light output portion that exits plane light emitted from the point light source and introduced through the light input surface, wherein the light guide plate includes an inclination portion between the light input surface and the light output portion, the inclination portion having a thickness gradually decreasing toward the light output portion side, an inclined surface of the inclination portion includes a pedestal for disposing the printed circuit board in an area except the front of the point light source, and a light-blocking member is disposed between the neighboring pedestals.

With this structure, since the light-blocking member is disposed between neighboring pedestals, the light-blocking member blocks propagation of leakage light to the light output portion side even when the leakage light is generated from the inclined surface of the inclination portion of the light guide plate. Therefore, it is possible to improve luminance uniformity of the illumination light of the spread illuminating apparatus.

In the first aspect, the printed circuit board is fixed to the light guide plate with a bonding member, the bonding member includes a branch portion including a portion corresponding to each pedestal and a connecting portion that connects a front end of each branch portion to a front end of the neighboring branch portion, and the light-blocking member is fixed to the connecting portion.

With this structure, the bonding member has the connecting portion that connects a front end of each branch portion and a front end of the neighboring branch portion. Therefore, it is possible to stably hold the branch portion of the bonding member when the printed circuit board is fixed to the light guide plate. Since the light-blocking member is fixed to the connecting portion of the bonding member, it is possible to suppress or avoid the connecting portion from making contact with the inclined surface of the inclination portion of the light guide plate even when such a connecting portion is provided in the bonding member.

As a result, it is possible to improve workability for fixing the printed circuit board to the light guide plate. In addition, it is possible to suppress or even eliminate: 1) an optical disparity in a refractive index, etc. at the inclined surface located in front of the point light source by which contact may or may not be made to the connecting portion of the bonding member; 2) change in distribution of light guided in the inclination portion and, 3) change in luminance distribution (visual effect) of the illumination light emitted from the light output portion.

In the first aspect, the bonding member is a double-sided tape.

With this structure, the bonding member such as a double-sided tape has the connecting portion that connects a front end of each branch portion to a front end of the neighboring branch portion. Therefore, it is possible to suppress a part of or the entire part of each branch portion from being peeled off together with the release liner when the release liner of the double-sided tape is peeled off in a work for fixing the printed circuit board to the light guide plate. Therefore, workability for fixing the printed circuit board to the light guide plate will be improved.

In the first aspect, the bonding member has a trunk portion that connects a rear end of each branch portion.

With this structure, it is possible to further stably hold the branch portion of the bonding member when the printed circuit board is fixed to the light guide plate.

In the first aspect, the light-blocking member has a trapezoidal shape whose width increases as moving in a front direction.

With this structure, when the pedestal for disposing the printed circuit board has a width decreasing toward the front direction as seen in a top plan view, improve of light-blocking properties of the light-blocking member can be well secured by effectively fitting the light-blocking member into a gap between the neighboring pedestals.

In the first aspect, a top surface of the pedestal has an inclined surface substantially parallel to the inclined surface of the inclination portion.

With this structure, a gap between the printed circuit board disposed in the pedestal and the inclined surface of the inclination portion of the light guide plate has a portion having a constant interval. Light leaked from the inclined surface can be thus well blocked with the light-blocking member having a constant thickness.

According to the present invention, there is provided a spread illuminating apparatus having the light guide plate with the inclination portion between the light input surface and the light output portion. The light guide plate is then configured as that its thickness gradually decreases as moving toward the light output portion side. The inclined surface of the inclination portion is provided with the pedestal for disposing the printed circuit board in an area except the front of the point light source. In the spread illuminating apparatus, it is thus possible to improve luminance uniformity of illumination light and workability for fixing the printed circuit board to the light guide plate.

BRIEF DESCRIPTION OF THE DRAWINGS

FIGS. 2A and 2B are plan views illustrating an flexible printed circuit board (FPC) used in the spread illuminating apparatus of FIG. 1 as seen from the mount surface side, in which FIG. 2A illustrates a state that a double-sided tape is disposed over the FPC, and FIG. 2B illustrates a state that a light-blocking member is further disposed over the double-sided tape of FIG. 2A;

DETAILED DESCRIPTION OF THE PREFERRED EMBODIMENTS

Figure 1:
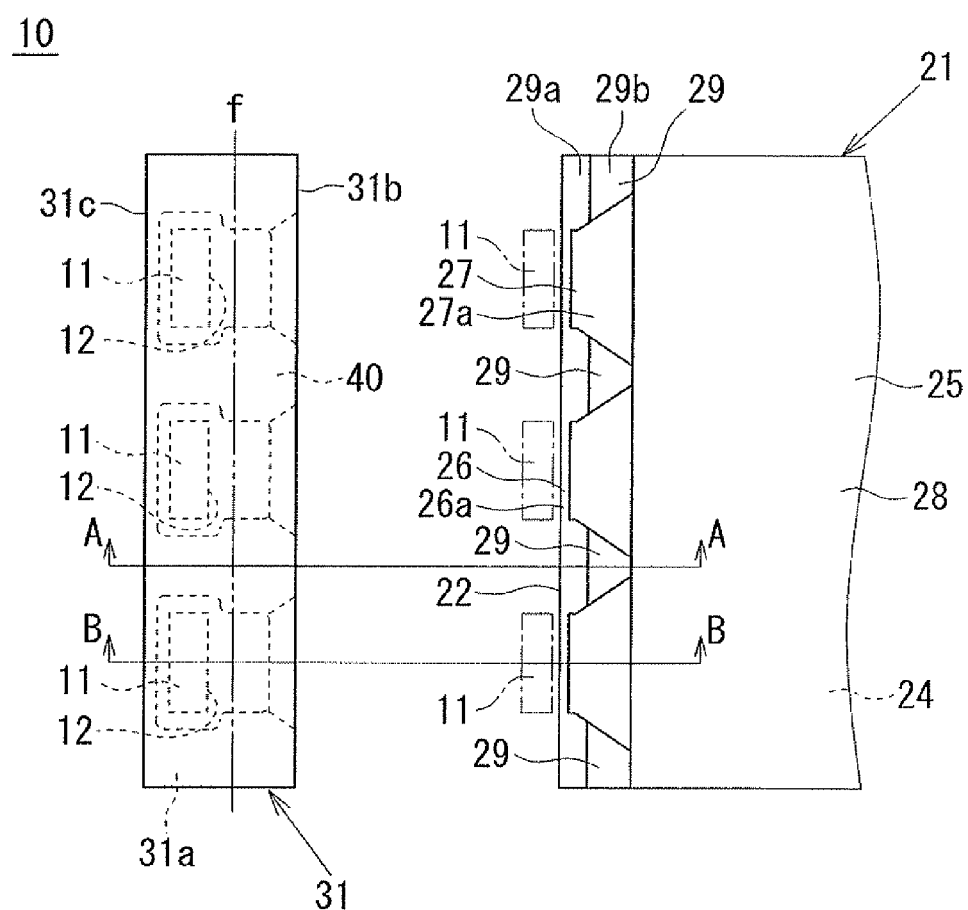
FIG. 1 is an exploded plan view illustrating main parts of a spread illuminating apparatus according to an embodiment of the present invention.

Hereinafter, a spread illuminating apparatus 10 according to an embodiment of the present invention will be described with reference to the accompanying drawings. Throughout the drawings described below, shapes, dimensions, and the like of each element may be appropriately scaled or exaggerated for convenient description purposes.

The spread illuminating apparatus 10 includes an LED 11 as a point light source, a light guide plate 21 that outputs light emitted from the LED 11 in a planar form, and a flexible printed circuit board (FPC) 31 as a printed circuit board on which the LEDs 11 are mounted.

The LED 11 according to the present embodiment is a pseudo white LED including a blue LED and a yellow fluorescent element. In addition, the LED 11 is a so-called side-view type LED generally formed in a rectangular shape and has a light-emitting surface 12 in one side face. In the spread illuminating apparatus 10, a plurality of LEDs 11 (three LEDs in the illustrated example) are arranged along a light input surface 22 at a predetermined interval from each other while the light-emitting surface 12 thereof faces the light input surface 22 of the light guide plate 21 described below.

The light guide plate 21 is made of a transparent material (such as polycarbonate resin) and is formed in a rectangular shape as viewed from a top plan view. The light guide plate 21 includes, on an external surface thereof, a light input surface 22 that is an end face on which the LEDs 11 are arranged, a reflection surface 24 as one of the main planes approximately perpendicular to the light input surface 22, and a light output surface 25 as the other main plane facing the reflection surface 24 in parallel.

According to the present invention, a direction from the light input surface 22 to the opposite end face (not illustrated) is defined as a "front direction" (therefore, a direction where the light-emitting surface 12 of the LED 11 is directed, and is also referred to as a light-guiding direction). A direction from the reflection surface 24 to the light output surface 25 is defined as an "upward direction." A direction perpendicular to both the front-rear direction and the up-down direction (longitudinal direction of the light input surface 22) is also referred to as a right-left direction (as necessary, a right or left direction is defined with respect to the front direction). Unless specified otherwise, "length," "thickness," and "width" refer to dimensions in the front-rear direction, the up-down direction, and the right-left direction, respectively.

Here, the light guide plate 21 includes a flat portion 26 formed in front of the light input surface 22, an inclination portion 27 that is formed continuously to the flat portion 26 and has a thickness gradually decreasing toward the front direction, and a light output portion 28 that is formed in front of the inclination portion 27 and emits, from the light output surface 25, the light guided from the LED 11 through the inclination portion 27.

The flat portion 26 is formed such that a thickness is constant in the front direction, and an top surface 26a in the light output surface 25 side is approximately perpendicularly to the light input surface 22. The inclination portion 27 is formed by providing, in the light output surface 25 side, an inclined surface 27a inclined at a constant gradient toward the reflection surface 24 side located in the front direction along a longitudinal direction of the light input surface 22.

The light output portion 28 is formed in a rectangular flat plate shape with a constant thickness. An optical path change pattern, for example, including a plurality of dots is formed in the reflection surface 24 side thereof. Since the optical path change pattern is formed, it is possible to change a propagation direction of light guided to the light output portion 28 so as to output light from the light output surface in a planar form.

Although not illustrated, a reflection sheet for returning light leaking from the reflection surface 24 to the light guide plate 21 is typically disposed in the reflection surface 24 side of the light guide plate 21. In the light output surface 25 side of the light output portion 28, a diffusion sheet and a pair of prism sheets are sequentially stacked and disposed to control directivity of light output from the light output surface 25. In addition, the spread illuminating apparatus 10 may further include a frame for storing such elements.

In the spread illuminating apparatus 10, the light guide plate 21 has a plurality of pedestals 29 (four pedestals in the present embodiment) formed in the inclined surface 27a side of the inclination portion 27 and separated from each other.

Four pedestals 29 are applied for arranging the FPC 31. The pedestals 29 are formed separately from each other across the inclined surface 27a and a part of the light output surface 25 near the inclined surface 27a but not formed in front of three LEDs 11. The top surface of each pedestal 29 serves as a receiving surface where the FPC 31 is mounted. The pedestal 29 includes a first surface 29a formed in the light input surface 22 side and a second surface 29b formed in front of the first surface 29a and inclined in the inclination portion 27 side from the first surface 29a side to the front direction. In addition, the pedestal 29 is shaped to have a width decreasing toward the front direction as viewed in a top view. Therefore, the inclined surface 27a provided between the neighboring pedestals 29 is shaped to have a width increasing toward the front direction.

Here, each pedestal 29 has a uniform thickness in the front direction from the light input surface 22 to a boundary with the second surface 29b. The first surface 29a serving as a top surface of each pedestal 29 therebetween is formed approximately perpendicularly to the light input surface 22. In addition, the first surface 29a is formed approximately flush with the top surface 26a of the flat portion 26. In other words, the first surface 29a of each pedestal 20 is formed by extending the flat portion 26 in the front direction but excluding the front side of the LED 11.

Furthermore, in the spread illuminating apparatus 10, the second surface 29b of each pedestal 29 is formed as an inclined surface substantially in parallel to the inclined surface 27a of the inclination portion 27 (for example, within a typical manufacturing error range in a resin molding).

Next, the FPC 31 is formed in a thin rectangle shape as viewed in a top plan view. The width (dimension of the long side 31b and 31c) of the FPC 31 is approximately equal to a dimension of the light input surface 22 of the light guide plate 21 in a longitudinal direction. Three LEDs 11 are mounted on the mount surface 31a of the FPC 31 along the long side 31c in the rear side of the FPC 31 while the light-emitting surface 12 thereof is approximately perpendicular to the mount surface 31a and is approximately parallel to the long side 31b and 31c.

In the FPC 31, at least a part of the portion located in front of a space for mounting the LED 11 is disposed over the light guide plate 21 (specifically, over the top surface 26a of the flat portion 26 and the first and second surfaces 29a and 29b of the pedestal 29). Therefore, a dimension of the short side of the FPC 31 has a length that not only covers the LED 11 but also extends further from the LED 11 in the forward direction.

In the spread illuminating apparatus 10, the FPC 31 on which the LEDs 11 are mounted is bent along the inclination of the second surface 29b against the first surface 29a at the bending position f corresponding to a boundary between the first and second surfaces 29a and 29b white the mount surface 31a thereof is directed to the light guide plate 21 side. In addition, the FPC 31 is disposed in the light guide plate 21 while the light-emitting surface 12 of the LED 11 faces a predetermined location of the light input surface 22 of the light guide plate 21.

Figure 3A:
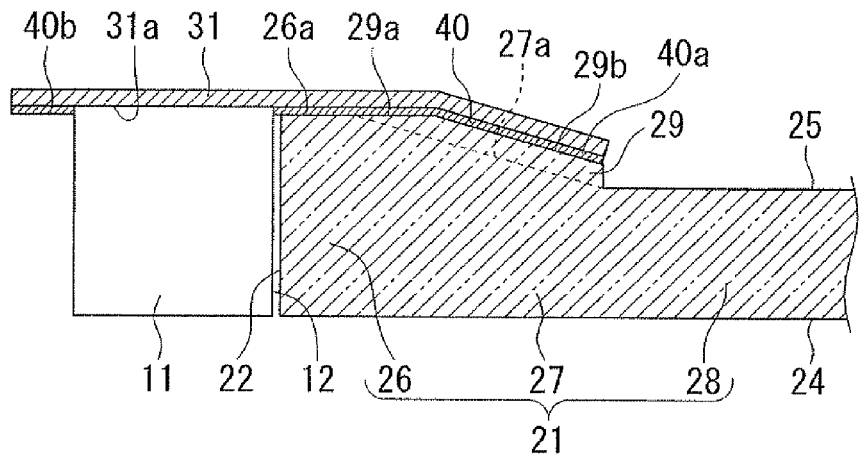
FIG. 3A is a cross-sectional view taken along a line A-A in an assembled state of the spread illuminating apparatus of FIG. 1.

In this case, the first and second surfaces 29a and 29b of the pedestal 29 and the top surface 26a of the flat portion 26 serve as a surface for receiving the mount surface 31a of the FPC 31. Among the receiving surfaces, the first and second surfaces 29a and 29b of the pedestal 29 and a portion on the top surface 26a of the flat portion 26 located in the rear side of the first surface 29a of the pedestal 29 serve as a bonding surface bonded to the mount surface 31a of the FPC 31 using a double-sided tape 40 (a bonding member according to the present embodiment) (refer to FIG. 3A).

The FPC 31 is fixed to the light guide plate 21 by bonding a part of the mount surface 31a to the bonding surface of the light guide plate 21 using the double-sided tape 40.

Figure 2A:
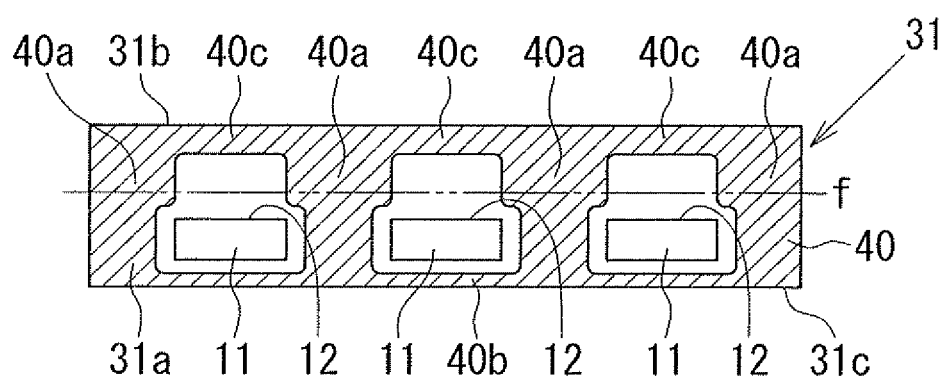

The double-sided tape 40 used to fix the FPC 31 to the light guide plate 21 includes a trunk portion 40b that is located in the rear side of the LEDs 11 and extends in a longitudinal direction of the FPC 31, a plurality of branch portions 40a extending from the trunk portion 40b to the front direction through the right and left sides of the LEDs 11, and a connecting portion 40c that connects the front end of each branch portion 40a to the front end of the neighboring branch portion 40a as illustrated in FIG. 2A. A portion corresponding to the bonding surface of the light guide plate 21 is included in the front end of each branch portion 40a.

Figure 2B:
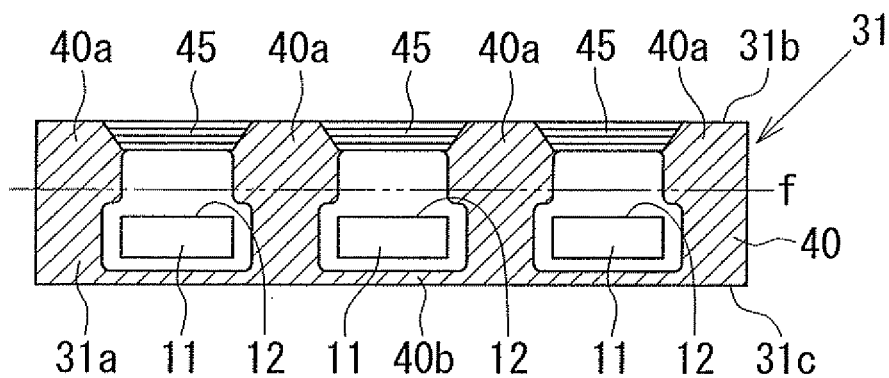

In the spread illuminating apparatus 10, a light-blocking member 45 is bonded and fixed to each connecting portion 40c of the double-sided tape 40 as illustrated in FIG. 2B. Such a light-blocking member 45 is disposed between the neighboring pedestals 29 over the inclined surface 27a (in other words, in front of each LED 11) when the FPC 31 is fixed to the light guide plate 21.

Figure 3B:
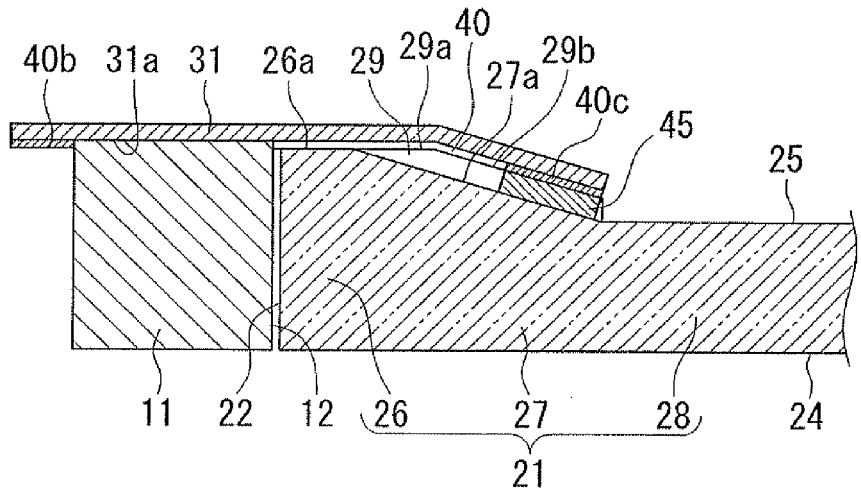
FIG. 3B is a cross-sectional view taken along a line B-B in an assembled state of the spread illuminating apparatus of FIG. 1.

In the spread illuminating apparatus 10, the light-blocking member 45 has a trapezoidal shape having a width increasing toward the front direction along a contour of the inclined surface 27a. In addition, in the spread illuminating apparatus 10, the second surface 29b of the pedestal 29 and the inclined surface 27a of the inclination portion 27 are substantially parallel to each other. Therefore, while the FPC 31 is fixed to the light guide plate 21, a gap between a portion interposed between the neighboring second surfaces 29b in the FPC 31 and the inclined surface 27a disposed directly thereunder has a substantially constant interval across the entire facing area. The light-blocking member 45 just fits into such a gap with a thickness corresponding to the aforementioned interval as illustrated in FIG. 3B.

Here, the light-blocking member 45 may be a light-absorbing member or a light-reflecting member. Similar to the light-blocking member 45 of the spread illuminating apparatus 10, the light-blocking member having a constant thickness may include, for example, a black polyethylene terephthalate (PET) film (light-absorbing member) or a white PET film (light-reflecting member).

In the spread illuminating apparatus 10 according to the present embodiment configured as described above, the light-blocking member 45 is disposed between the neighboring pedestals 29 (that is, in front of the LED 11). Therefore, even when light leaks from the inclined surface 27a of the inclination portion 27 of the light guide plate 21, the light-blocking member 45 blocks propagation of the leakage light toward the light output portion 28 side. Accordingly, it is possible to improve luminance uniformity of the illumination light of the spread illuminating apparatus 10.

In the spread illuminating apparatus 10, the double-sided tape 40 as a bonding member has a connecting portion 40c that connects each front end of the branch portion 40a to the front end of the neighboring branch portion 40a. As a result, it is possible to suppress a part of or the entire part of the branch portion 40a from being peeled off together with a release liner of the double-sided tape 40 when the release liner is peeled off in a work fixing the FPC 31 to the light guide plate 21. Therefore, it is possible to improve workability for fixing the FPC 31 to the light guide plate 21.

In this case, the light-blocking member 45 is fixed to the connecting portion 40c of the double-sided tape 40. As a result, the light-blocking member 45 blocks or suppresses the connecting portion 40c of the double-sided tape 40 itself from making contact with the inclined surface 27a. Therefore, it is possible to suppress or even eliminate: 1) an optical difference in a refractive index, etc. in front of the LED 11 by which the connecting portion 40c may or may not contact to the inclined surface 27a; 2) change in distribution of light guided in the inclination portion 27 and, 3) change in luminance distribution (visual effect) of the illumination light emitted from the light output portion 28.

Here, in the spread illuminating apparatus 10, it would be advantageous that the pedestal 29 is configured to have a width decreasing toward the front direction in the front leading end side as seen in a top plan view, and the gap between the neighboring pedestals 29 (that is, inclined surface 27a) is widened toward the front direction. This remarkably increases the areas of the first and second surfaces 29a and 29b of the pedestal 29 without hindering propagation of light guided to the inclination portion 27. This is because light emitted from the light output surface 12 of the LED 11 propagates through the light guide plate 21 toward the front direction in a fan shape. It is thus possible to improve a bonding strength between the FPC 31 and the light guide plate 21.

In the spread illuminating apparatus 10, for coping with such a shape of the inclined surface 27a, the light-blocking member 45 is configured to have a trapezoidal shape with a width increasing toward the front direction. It is thus possible to improve light-blocking properties of the light-blocking member 45 by being effectively fit into the gap between the neighboring pedestals 29. In addition, this specific shape would be also advantageous to reduce contact by the connecting portion 40c of the double-sided tape 40 to the inclined surface 27a.

In the spread illuminating apparatus 10, the second surface 29b substantially parallel to the inclined surface 27a of the inclination portion 27 is included in a top surface of the pedestal 29. Therefore, it is possible to effectively block leakage light from the inclined surface 27a with a member having a constant thickness such as a black PET film or a white PET film as the light-blocking member 45.

The present invention is not however limited by any of the above configurations. The top surface of the pedestal 29 may or may not include the inclined surface. Or, in case the inclined surface is included, the inclined surface may or may not be parallel to the inclined surface 27a of the inclination portion 27. Here, the top surface of the pedestal 29 may be chosen freely as long as the light-blocking member 45 has an appropriate shape that can fit into the gap between the FPC 31 and the inclined surface 27a.

Figure 4:
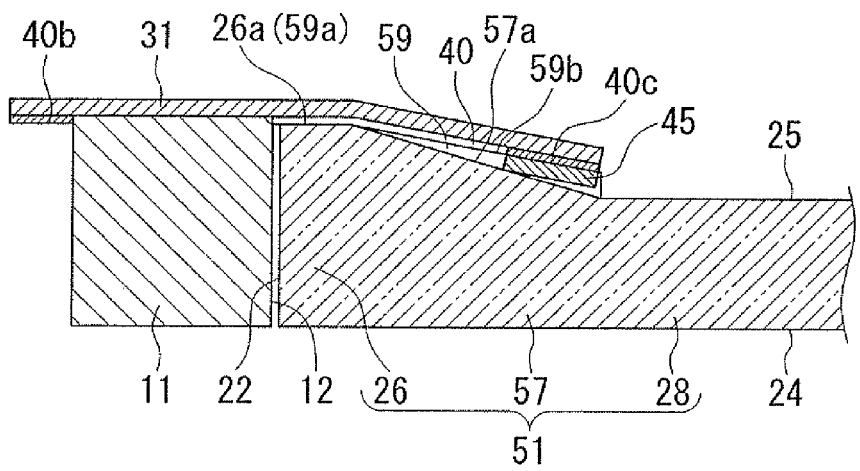
FIG. 4 is a cross-sectional view illustrating another example of the spread illuminating apparatus according to an embodiment of the present invention.

As illustrated in FIG. 4, the light guide plate 51 of the spread illuminating apparatus according to the present invention may have a pedestal 59 having a first surface 59a approximately flush with the top surface 26a of the flat portion 26 and a second surface 59b more gently inclined than the inclined surface 57a of the inclination portion 57. In this configuration, since the gap between the FPC 31 and the inclined surface 57a has an interval increasing toward the front direction, the light-blocking member may have a thickness corresponding to the width of the gap. Alternatively, as illustrated in FIG. 4, the light-blocking member 45 may have a constant thickness. Similarly, in this case, it is possible to improve luminance uniformity of the illumination light by blocking leakage light from the most part of the inclined surface 57a using the light-blocking member 45.

In this manner, if the second surface 59b of the pedestal 59 is more gently inclined than the inclined surface 57a of the inclination portion 57, it is possible to reduce a reactive force generated by bending the FPC 31 in a bending position corresponding to a boundary between the first and second surfaces 59a and 59b when the FPC 31 is fixed to the light guide plate 21. For this, the FPC 31 can be stably fixed to the light guide plate 21 for an extended period of time.

In the aforementioned description, the double-sided tape 40 used in the spread illuminating apparatus 10 has a trunk portion 40b that is located in the rear side of the LED 11 and extends in the longitudinal direction of the FPC 31. This can suppress a part of or the entire part of each branch portion 40a from being peeled off together with the release liner of the double-sided tape 40 when the release liner is peeled off and stably hold each branch portion 40a. However, depending on a specification of the spread illuminating apparatus 10, it may, in some cases, be difficult to find a space for the trunk portion 40b in the rear side of the LED 11 of the FPC 31.

However, even in this case, in the spread illuminating apparatus 10, since the connecting portion 40c that connects the front end of each branch portion 40a to the front end of the neighboring branch portion 40a is provided in the double-sided tape 40, and each branch portion 40a is not formed in an island shape, it is possible to stably hold each branch portion 40a when the release liner of the double-sided tape 40 is peeled off. Therefore, it is possible to improve workability for fixing the FPC 31 to the light guide plate 21.

Figure 5:
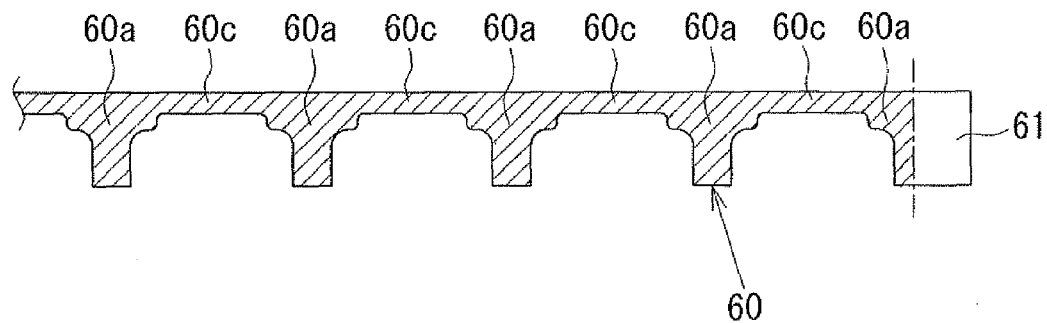
FIG. 5 is a plan view illustrating an exemplary double-sided tape used in the spread illuminating apparatus according to an embodiment of the present invention while a release liner is attached.

Referring to FIG. 5, an example of the double-sided tape 60 with no trunk portion when the release liner is attached is illustrated. In FIG. 5, the branch portion 60a and the connecting portion 60c (hatched) of the double-sided tape 60 include a main body of the double-sided tape 60 and a release liner that covers the main body. In addition, a portion 61 extending from the outermost branch portion 60a (right side in FIG. 5) to the outer side includes only the release liner and is used as a tab when the release liner is peeled off.

Figure 9:
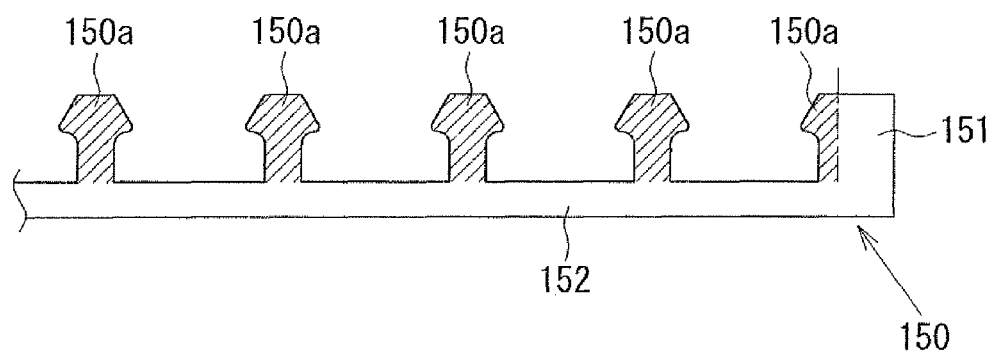
FIG. 9 is a plan view illustrating an exemplary double-sided tape used in the spread illuminating apparatus of related art while a release liner is attached.

Since the double-sided tape 60 has the connecting portion 60c, each branch portion 60a does not have an island shape even when the trunk portion is not provided in the rear side of each branch portion 60a. Furthermore, unlike the double-sided tape 150 of the related art illustrated in FIG. 9, it is not necessary to provide the release liner with the temporary trunk portion 152.

Figure 6:
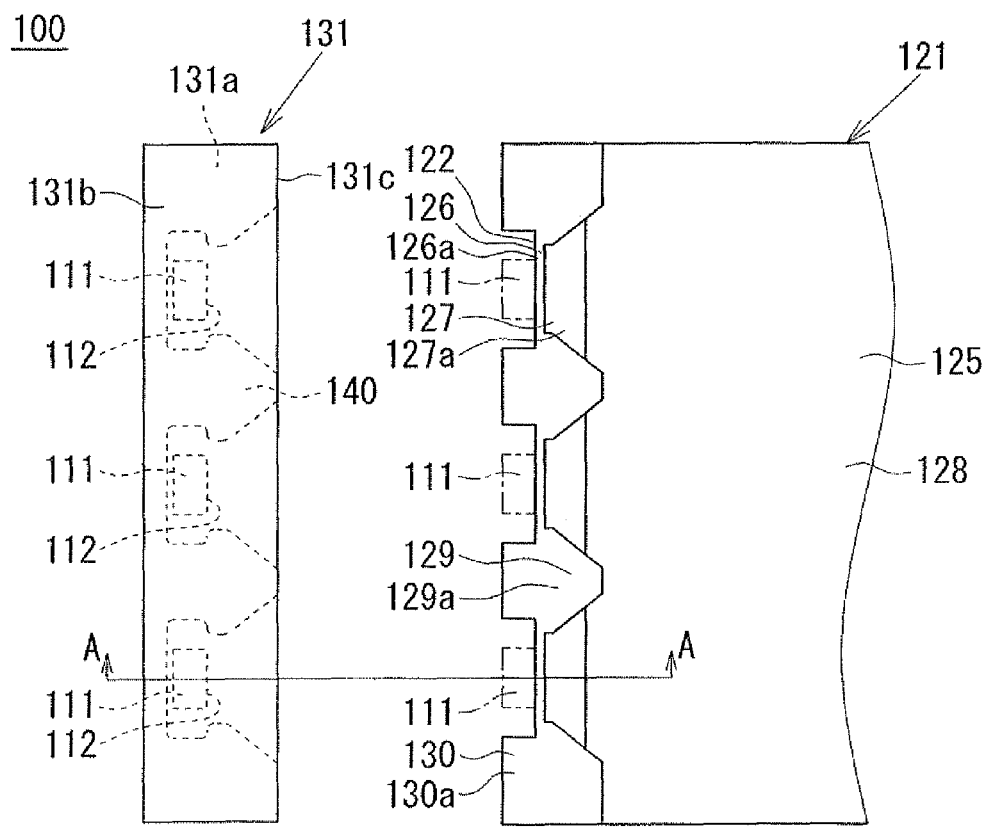
FIG. 6 is an exploded plan view illustrating main parts of an exemplary spread illuminating apparatus of related art.
Figure 7:
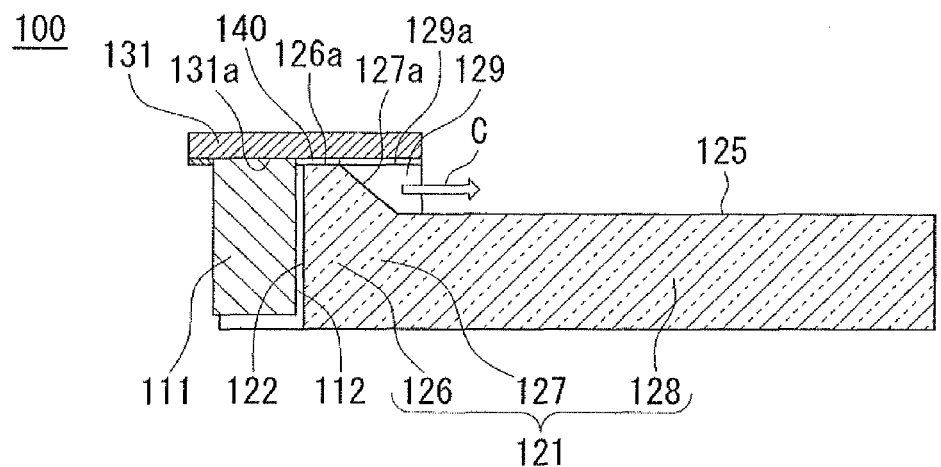
FIG. 7 is a cross-sectional view taken along a line A-A in an assembled state of the spread illuminating apparatus of FIG. 6.
Figure 8:
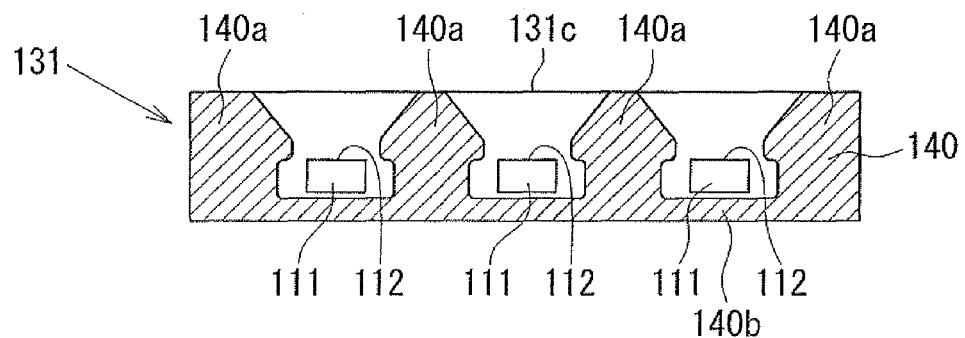
FIG. 8 is a plan view illustrating the FPC used in the spread illuminating apparatus of FIG. 6 as seen from the mount surface side.

In the spread illuminating apparatus according to the present invention, the flat portion 26 is not essential to obtain favorable optical functionalities and thus dispensable. In addition, the spread illuminating apparatus according to the present invention may have a claw portion similar to the claw portion 130 of the spread illuminating apparatus of the related art illustrated in FIG. 6. In this case, when the FPC 31 is fixed to the light guide plate 21, a top surface of the claw portion may also be used as a bonding surface where the mount surface 31a of the FPC 31 is boned using the double-sided tape 40.

What is claimed is:

1. A spread illuminating apparatus comprising:
   a plurality of point light sources;
   a printed circuit board on which the plurality of point light sources is each mounted; and
   a light guide plate with a light input surface facing the point light sources and a light output portion that exits plane light emitted from the point light sources and introduced through the light input surface,
   wherein the light guide plate includes an inclination portion between the light input surface and the light output portion, the inclination portion comprising an inclined surface a thickness of which gradually decreases toward the light output portion side,
   the inclined surface includes at least one pedestal for disposing the printed circuit board, the at least one pedestal being positioned in an area except the front of the point light source, and
   a light-blocking member is disposable on the inclined surface of the inclined portion at the light guide plate, the blocking member being placed in front of each of the plurality of point light sources which is sandwiched between pedestals adjacent to each other.

2. The spread illuminating apparatus according to claim 1, wherein the printed circuit board is fixed to the light guide plate with a bonding member,
   the bonding member includes a branch portion including a portion corresponding to each pedestal and a connecting portion that connects a front end of each branch portion to a front end of the neighboring branch portion, and
   the light-blocking member is fixed to the connecting portion.

3. The spread illuminating apparatus according to claim 2, wherein a top surface of the pedestal has an inclined surface substantially parallel to the inclined surface of the inclination portion.

4. The spread illuminating apparatus according to claim 2, wherein the bonding member is a double-sided tape.

5. The spread illuminating apparatus according to claim 4, wherein a top surface of the pedestal has an inclined surface substantially parallel to the inclined surface of the inclination portion.

6. The spread illuminating apparatus according to claim 4, wherein the bonding member has a trunk portion that connects a rear end of each branch portion.

7. The spread illuminating apparatus according to claim 6, wherein the light-blocking member has a trapezoidal shape whose width increases as moving in a front direction.

8. The spread illuminating apparatus according to claim 7, wherein a top surface of a pedestal of the at least one pedestal has an inclined surface substantially parallel to the inclined surface of the inclination portion.

9. The spread illuminating apparatus according to claim 6, wherein a top surface of a pedestal of the at least one pedestal has an inclined surface substantially parallel to the inclined surface of the inclination portion.

10. The spread illuminating apparatus according to claim 4, wherein the light-blocking member has a trapezoidal shape whose width increases as moving in a front direction.

11. The spread illuminating apparatus according to claim 10, wherein a top surface of a pedestal of the at least one pedestal has an inclined surface substantially parallel to the inclined surface of the inclination portion.

12. The spread illuminating apparatus according to claim 2, wherein the bonding member has a trunk portion that connects a rear end of each branch portion.

13. The spread illuminating apparatus according to claim 12, wherein the light-blocking member has a trapezoidal shape whose width increases as moving in a front direction.

14. The spread illuminating apparatus according to claim 13, wherein a top surface of a pedestal of the at least one pedestal has an inclined surface substantially parallel to the inclined surface of the inclination portion.

15. The spread illuminating apparatus according to claim 12, wherein a top surface of the pedestal has an inclined surface substantially parallel to the inclined surface of the inclination portion.

16. The spread illuminating apparatus according to claim 2, wherein the light-blocking member has a trapezoidal shape whose width increases as moving in a front direction.

17. The spread illuminating apparatus according to claim 16, wherein a top surface of a pedestal of the at least one pedestal has an inclined surface substantially parallel to the inclined surface of the inclination portion.

18. The spread illuminating apparatus according to claim 1, wherein the light-blocking member has a trapezoidal shape whose width increases as moving in a front direction.

19. The spread illuminating apparatus according to claim 18, wherein a top surface of a pedestal of the at least one pedestal has an inclined surface substantially parallel to the inclined surface of the inclination portion.

20. The spread illuminating apparatus according to claim 1, wherein a top surface of a pedestal of the at least one pedestal has an inclined surface substantially parallel to the inclined surface of the inclination portion.

* * * * *